United States Patent

Skeldon et al.

[11] Patent Number: 5,886,808
[45] Date of Patent: Mar. 23, 1999

[54] PULSE SHAPING SYSTEM

[75] Inventors: Mark D. Skeldon, Penfield, N.Y.; Samuel A. Letzring, Jemez Springs, N. Mex.

[73] Assignee: University of Rochester, Rochester, N.Y.

[21] Appl. No.: 911,110

[22] Filed: Aug. 14, 1997

[51] Int. Cl.$^6$ .................................................. G02F 1/03
[52] U.S. Cl. .................... 359/264; 359/320; 327/291; 356/39
[58] Field of Search .................................... 359/290, 295, 359/275, 264, 320, 322; 327/291; 356/39

[56] References Cited

U.S. PATENT DOCUMENTS

| | | | |
|---|---|---|---|
| 3,724,926 | 4/1973 | Lee | 359/264 |
| 3,902,061 | 8/1975 | Harris | 359/320 |
| 4,179,194 | 12/1979 | Geller et al. | 359/264 |
| 4,317,235 | 2/1982 | Tsukada | 359/264 |
| 5,452,121 | 9/1995 | Hilgeman | 359/320 |

*Primary Examiner*—Loha Ben
*Attorney, Agent, or Firm*—M. LuKacher

[57] ABSTRACT

Temporally shaped electrical waveform generation provides electrical waveforms suitable for driving an electro-optic modulator (EOM) which produces temporally shaped optical laser pulses for inertial confinement fusion (ICF) research. The temporally shaped electrical waveform generation is carried out with aperture coupled transmission lines having an input transmission line and an aperture coupled output transmission line, along which input and output pulses propagate in opposite directions. The output electrical waveforms are shaped principally due to the selection of coupling aperture width, in a direction transverse to the lines, which varies along the length of the line. Specific electrical waveforms, which may be high voltage (up to kilovolt range), are produced and applied to the EOM to produce specifically shaped optical laser pulses.

11 Claims, 6 Drawing Sheets

PULSE SHAPING SYSTEM

The United States Government has rights in this invention pursuant to Contract DE-FC03-93SF19460 between the University of Rochester and the Department of Energy, Office of Inertial Confinement Fusion.

The present invention relates to pulse shaping systems for providing temporally shaped electrical pulses, and to optical, especially laser pulse shaping systems whereby optical pulses are temporally shaped through the use of the shaped electrical pulses.

The invention is especially suitable for providing a system for shaping laser pulses for use in inertial confinement fusion (ICF), and provides a pulse shaping system which is simpler and less complex than what has heretobefore been implemented in fusion laser systems for ICF research.

A pulse shaping system which has been implemented is described in Solid state lasers for application to inertial confinement fusion, 1995, Monterey, Calif.: SPIE. A similar pulse shaping system is described in Wilcox. *Fusion laser oscillator and pulse-forming system using integrated optics*, in Laser Coherence control: Technology and applications, 1993. Bellingham, Wash. These systems apply shaped voltage waveforms to a dual-channel integrated- optics modulator. These electrical waveform generators are based on electrical reflections from variable impedance micro striplines (VIMSL). See U.S. Pat. No. 4,667,161. Electrical waveform generators based on these VIMSL's provide acceptable temporal resolution due to their high bandwidth capabilities and to micro stripline fabrication procedures and tolerances. One such pulse shaping system at LLE is shown in FIG. 1(a) and consists of many components. A CW-mode-locked (CWML) laser 10 is used to seed a regenerative amplifier (regen) 12. The pulse width of the optical pulse injected into the regen 12 is stretched in time with an intracavity etalon inserted in the regen 12. This pulse-width stretching technique is described in Skeldon, *Temporal mode structure of a regenerative amplifier with intracavity etalons*. JOSA B, 1993. 10: p. 677–683. The output of the regenerative amplifier is pre-amplified 14 and its leading edge is steepened with an SBS reflection generated by focusing the optical pulse in a liquid cell (steepener 16). This steepener is described in Skeldon, *Transient stimulated Brillouin scattering pulse compression for photoconductive switch activation*, in Solid state lasers for application to inertial confinement fusion. 1995. Monterey, Calif.: SPIE. This SBS pulse is amplified with amplifiers 14 and 15 and sent to an optical fiber distribution system 18. The outputs of the optical fibers 19 are used to trigger a photoconductively (PC) switched charge line 20 for the generation of specific temporally-shaped electrical waveforms, via reflections from the VIMSL 22. These shaped electrical waveforms are sent to optical modulators 24 that consequently shape an optical (laser) pulse. This shaped optical pulse is then injected into the ICF laser system where it is amplified and sent to fusion targets.

The optically activated PC switches as shown in FIG. 1(a) and discussed in the Wilcox paper cited above operate as follows. When the first PC switch (PC1 in FIG. 1(a)) near the VIMSL 22 is optically activated, a square electrical waveform propagates from the charge line to the VIMSL. The reflected and shaped electrical waveform from the VIMSL propagates back to the modulator through PC1 and the second PC switch (PC2 in FIG. 1(a)) that is activated a short time after PC1. This shaped electrical waveform, applied to the modulator, shapes an optical pulse that is propagating through the modulator synchronized to the arrival of the electrical waveform. The transfer function of a typical modulator is given by $$T = \sin^2\left(\frac{\pi}{2} \frac{V(t)}{V_0}\right)$$

where $V_0$ is the half wave voltage of the modulator (a constant) and $V(t)$ is the temporally shaped voltage waveform input to the modualtor. More specifically, when the first PC1 switch is activated, an electrical waveform propagates in both directions along the charge line. One waveform propagates to the VIMSL and the other waveform propagates to the second, as yet unactivated, PC2 switch. The latter waveform reflects from this high-impedance (unactivated) PC2 switch back to the VIMSL to complete the square pulse in this direction. A shortcoming of this scheme is that upon reflection from the unactivated PC2 switch, an unwanted electrical spike is capacitively coupled across the PC2 switch and sent directly to the modulator. This spike arrives at the modulator in advance of the desired shaped electrical waveform from the VIMSL and produces an unwanted optical pre-pulse spike on the output optical waveform. To remove this optical spike from the final optical waveform, a synchronized square electrical gate pulse is applied to the second channel of the modulator. In addition if the line has a residual voltage on it when the second PC2 switch is activated (due to the fact that the final activated impedance of the first PC1 switch is not exactly zero), a small step voltage is applied to the modulator prior to the arrival of the shaped electrical waveform. This pre-pulse step voltage degrades the modulator contrast ratio (i.e., the ratio of the optical pulse maximum amplitude to the pre-pulse amplitude). This voltage can be compensated for by intentionally designing a precise impedance offset (mismatch) throughout the VIMSL. The contrast of the modulator is improved by precisely timing the leading edge of the gate pulse applied to the second channel of the modulator to eliminate any pre-pulse. A second shortcoming to this scheme is that the shaped electrical waveform generated in this system must propagate back through two PC switches to the modulator. It is believed that propagation through PC switches degrades the bandwidth of the electrical waveform, and hence, this is an undesirable consequence of the design.

It is a principal feature of this invention to provide a simpler pulse shaping system than the complex system shown in FIG. 1(a) and to eliminate all the shortcomings discussed above. The simplicity of this pulse-shaping system is apparent from FIG. 1(b). An ordinary square pulse generator 30 is input to an aperture coupled stripline (ACSL) 32 (a stripline discussed here is a specific type of transmission line) that effectively generates shaped electrical waveforms from the pulses from the generator 30. The shaped pulses are of sufficiently high voltage to operate an optical modulator 34, similar to the modulator 24, thereby provided shaped optical pulses. The system eliminates the need for the CWML laser 10, the regen 12 with SBS compressor 16 and amplifiers 14 and 15, the fiber distribution system 18 and the PC switches. In addition to this reduction in complexity, the system provides electrical pulses more representative of the desired temporal shape and magnitude. The invention therefore provides a pulse shaping system that can be implemented at relatively low cost, making it practicable for use in small, inexpensive laser systems.

The foregoing features and advantages of the invention and presently preferred embodiments thereof will be apparent from the Figures discussed above and more apparent from the following description when read with the above and other Figures, which described briefly, are as follows:

FIGS. 1(a) & (b) are schematic block diagrams of the above described optical pulse shaping systems FIG. 1(a) showing a prior art existing system, and FIG. 1(b) showing generally a system according to the present invention.

Figure 2:
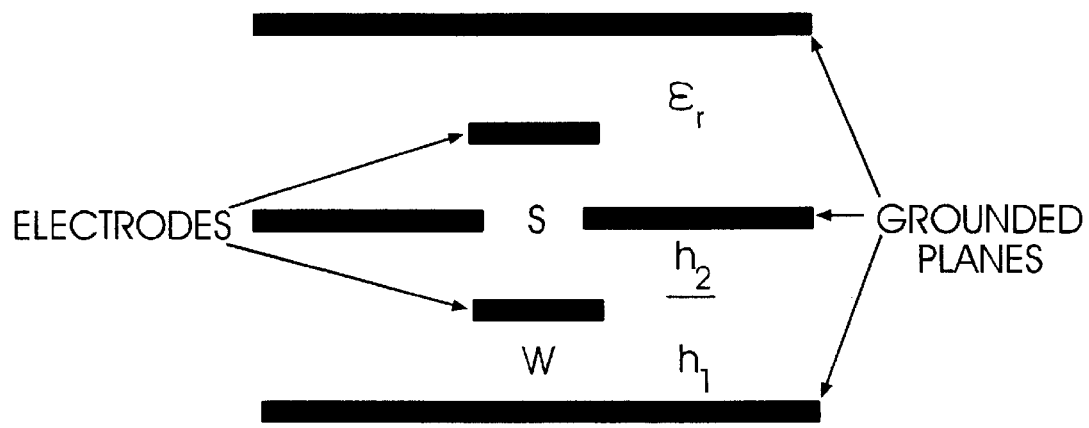
FIG. 2 is a schematic, cross sectional view of an aperture coupled stripline (ACSL); a specific type of aperture coupled transmission line which has been discovered, in accordance with the invention to have temporal pulse shaping capabilities.
Figure 3:
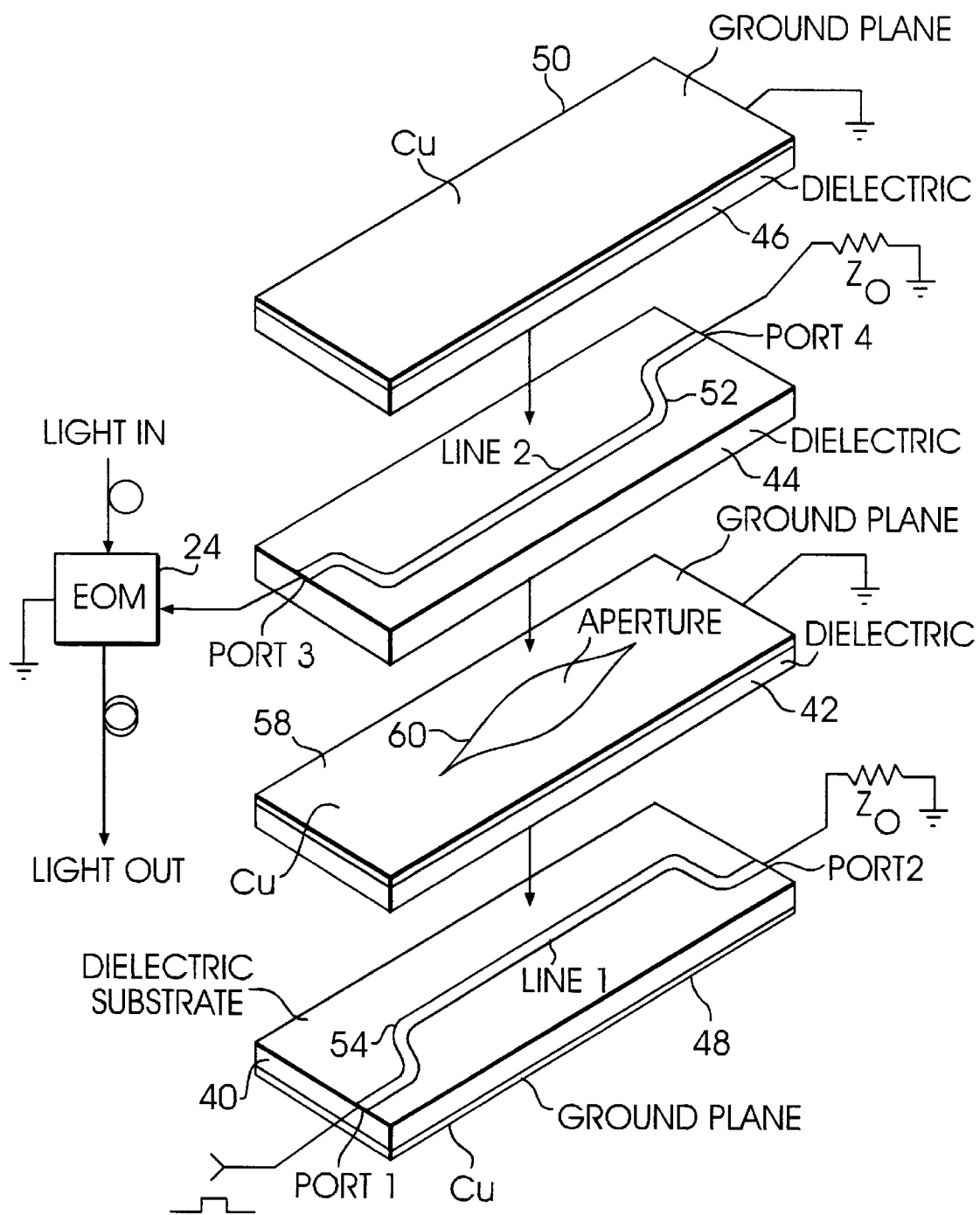
FIG. 3 is an exploded perspective view of an aperture coupled stripline (ACSL) useful in a system according to the invention.

Referring to FIGS. 2 and 3, a square electrical pulse is launched into port 1 and propagates along line 1 to the terminated port 2 of the ACSL. As the square pulse propagates along line 1, signal is coupled through an aperture to line 2 and travels backward, exiting at port 3. The amount of coupling depends on the width of the coupling aperture and is discussed hereinafter. By varying the width of the coupling aperture along the length of the line, any desired temporally shaped electrical waveform can be generated. This shaped electrical waveform can then be sent to the electro-optic modulator 24 for optical pulse shaping.

Figure 1:
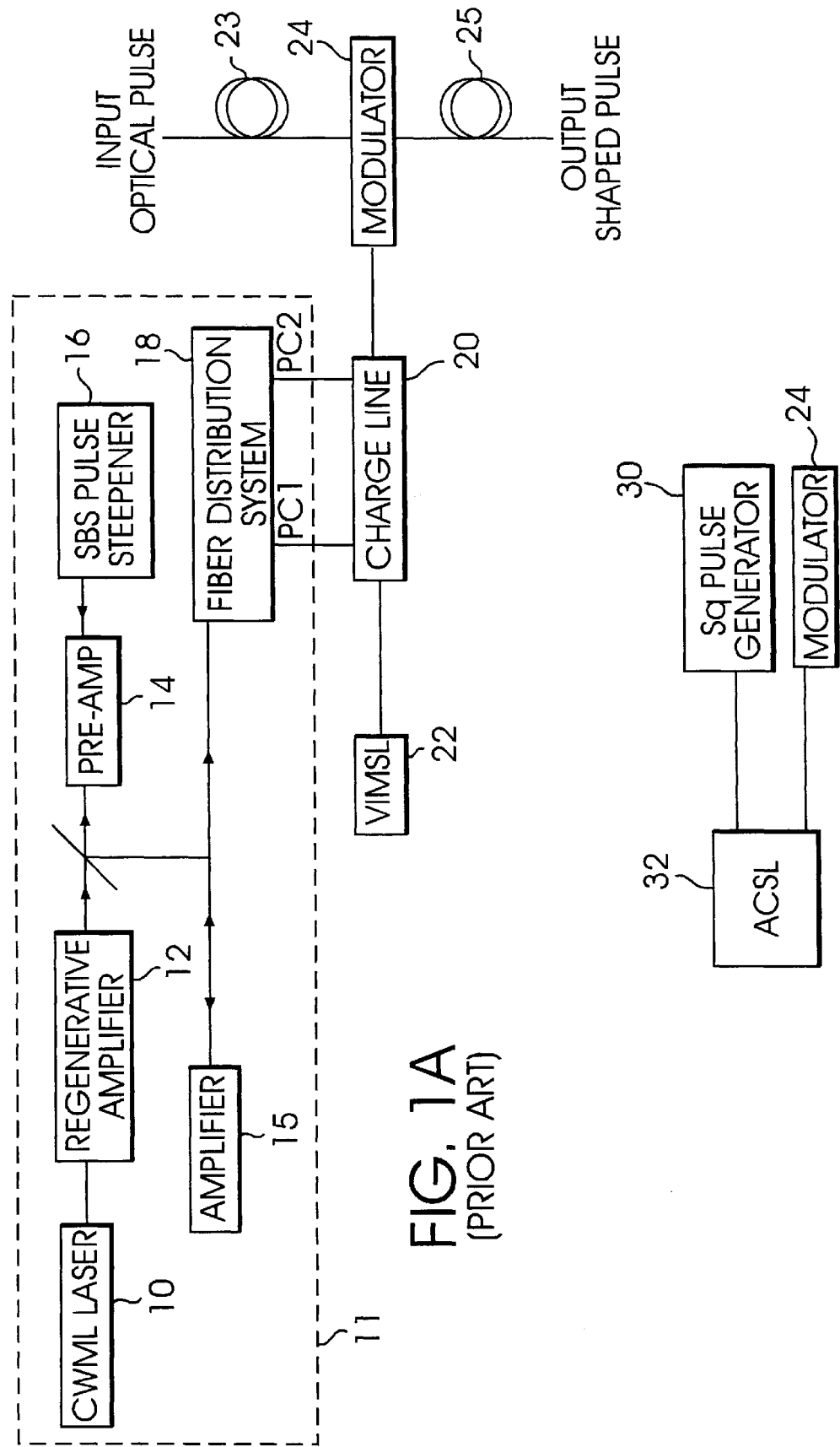

An operational advantage of this pulse shaping system is that the shaped electrical waveform exits from a different port than the port used to input the square electrical pulse. This feature eliminates many of the problems discussed above in connection with FIG. 1(a) the existing system. For instance, the shaped pulse does not propagate through PC switches and, in fact, no PC switches are required in the system at all. In addition, there is no source of pre-pulse noise since coupling cannot occur before application of the square electrical pulse, hence, the system cannot produce a capacitive voltage spike or pre-voltage step. This avoids the need for gate pulses and applying shaped electrical waveforms to both channels of a modulator. Contrast and dynamic range equals or exceeds the FIG. 1(a) system. In addition to the above performance enhancement, since the input and output ports are now separate, any suitable square-pulse generator 30 can be used, as shown schematically in FIG. 1(b), such as electrical square-pulse generators with sub-ns rise and fall times and variable pulse widths, as are commercially available. With a simple electrical square-pulse generator, all of the hardware shown in the dotted box 11 in FIG. 1(a) (specifically the CWML laser, the regen with SBS steepener and amplifiers, the fiber distribution system and the PC switches) are eliminated, resulting in simplification and more reliable system without degradation and with improved performance. As a further consequence, the output from one ACSL can be divided and used to drive many individual optical pulse shaping systems (e.g., different optical modulators) or a high voltage square pulse generator can be divided and sent to many ACSL's.

The design of an ACSL is based on a four layer system as shown in FIGS. 2 and 3. As outlined above, a square electrical pulse is launched into port 1 of the device and propagates along line 1 to the terminated port 2. Electrical signal is coupled to line 2 through an aperture of width s in the intermediate layer and propagates along line 2 and exits at port 3. The system is characterized by an input and output impedance. Ports 2 and 4 are terminated with the characteristic impedance of the stripline. The characteristic impedance of the system can be 50 ohms to match the input impedance of the modulator input and the output impedance of typical square pulse generators. The transition section of the lines at the ends where the connectors and the transition to the geometry of FIG. 2 occurs, is designed so that, the aperture width, s=0 and the resulting stripline has a characteristic impedance of 50 ohms. For the case with s=0, the system can be thought of as two separate uncoupled and non-interacting ordinary striplines. To achieve a 50 ohm stripline in this section, the width of the electrode W is chosen according to the relations given by B. C. Wadell, *Transmission line Design Handbook*, Avtech House, Boston, p. 130, 1991, $$Z_0 = \frac{\eta_0}{2\pi\sqrt{\epsilon_r}} \cosh^{-1}(A) \qquad (1)$$

where $$A = \sin\left(\frac{\pi h_2}{(h_1 + h_2)}\right) \coth\left(\frac{\pi w}{4(h_1 + h_2)}\right) \qquad (2)$$

and $Z_0$=the characteristic impedance of the stripline, $\eta_0$=the characteristic impedance of free space (377 ohms), $h_1$=distance from the lower ground plane to the electrode, $h_2$=distance from the upper ground plane to the electrode, w=the width of the electrode, $\epsilon_r$=the dielectric constant of the material, and we have assumed that the electrode width is much greater than the thickness of the copper.

Figure 4:
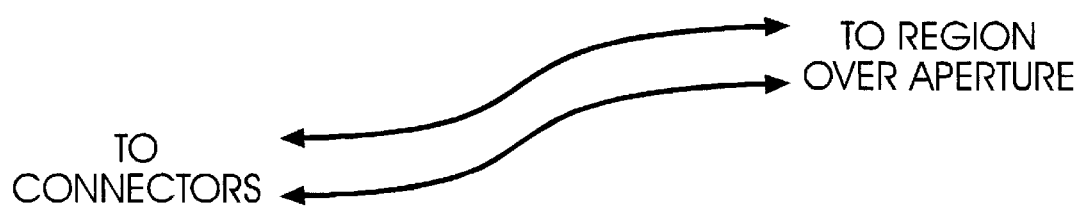
FIG. 4 shows the aperture coupled stripline (ACSL) lines or electrodes in the transition regions, at the ends of the lines between the electrical connectors (not shown), which provide the ports of the lines, and the straight regions overlapping and bisecting the aperture, i.e., this drawing shows the transition to the geometry show in FIG. 2.

Solving Eq. 1 for A and equate this with Eq. 2 and use $$\coth^{-1}x = 1/2\ln\left(\frac{x+1}{x-1}\right) \quad \text{for } x > 1 \qquad (3)$$

the expression obtained is $$w = \frac{4(h_1 + h_2)}{2\pi}\left\{\ln\left[\frac{\cosh\left(\frac{2\pi\sqrt{\epsilon_r}\,Z_0}{\eta_0}\right)}{\sin\left(\frac{\pi h_2}{(h_1 + h_2)}\right)} + 1\right] - \ln\left[\frac{\cosh\left(\frac{2\pi\sqrt{\epsilon_r}\,Z_0}{\eta_0}\right)}{\sin\left(\frac{\pi h_2}{(h_1 + h_2)}\right)} - 1\right]\right\}$$

for the width of the stripline as a function of the impedance $Z_0$. Table 1 gives the stripline width corresponding to $Z_0$=50 ohms as a function of thickness $h_1$ and $h_2$ and $\epsilon_r$ for commercially available materials. The stripline electrodes must overlap in the coupling region of the structure as shown in cross section in FIG. 2. In the transition region, on the other hand, electrodes must turn in order to accommodate the connectors as shown in FIG. 3. The presently preferred design in the transition region is to maintain a constant width of the electrode perpendicular to the waveform propagation direction. This is accomplished by radiusing two turns in the electrode as seen in FIG. 4. The edges of the electrode are radiused with common centers of curvature. This ensures that the perpendicular width of the electrode is constant throughout the transition region.

In order to produce shaped voltage waveforms from port 3, the coupling coefficient from line 1 to line 2 as a function of aperture width s must be determined.

An ACSL structure as shown in FIG. 3 consisting of four layers of RT/duroid 5580 microwave laminate material ($\epsilon_r$=2.2) sandwiched together as illustrated in FIG. 3 was constructed and tested. The two outer layers were 0.125" thick and had 1 oz. copper on their outer surfaces. The stripline electrode on the opposite side was 3.05 mm wide (experimentally determined to produce a 50 ohm input impedance) and was machined with a precision programmable milling machine. The two center layers were 0.062" thick. One center layer had no copper on either surface and was used as a dielectric spacer. The other center layer had copper on one side only, with copper removed to form the appropriate coupling aperture. The structure is easily disassembled to replace the aperture layer to produce different electrical pulse shapes.

Figure 5:
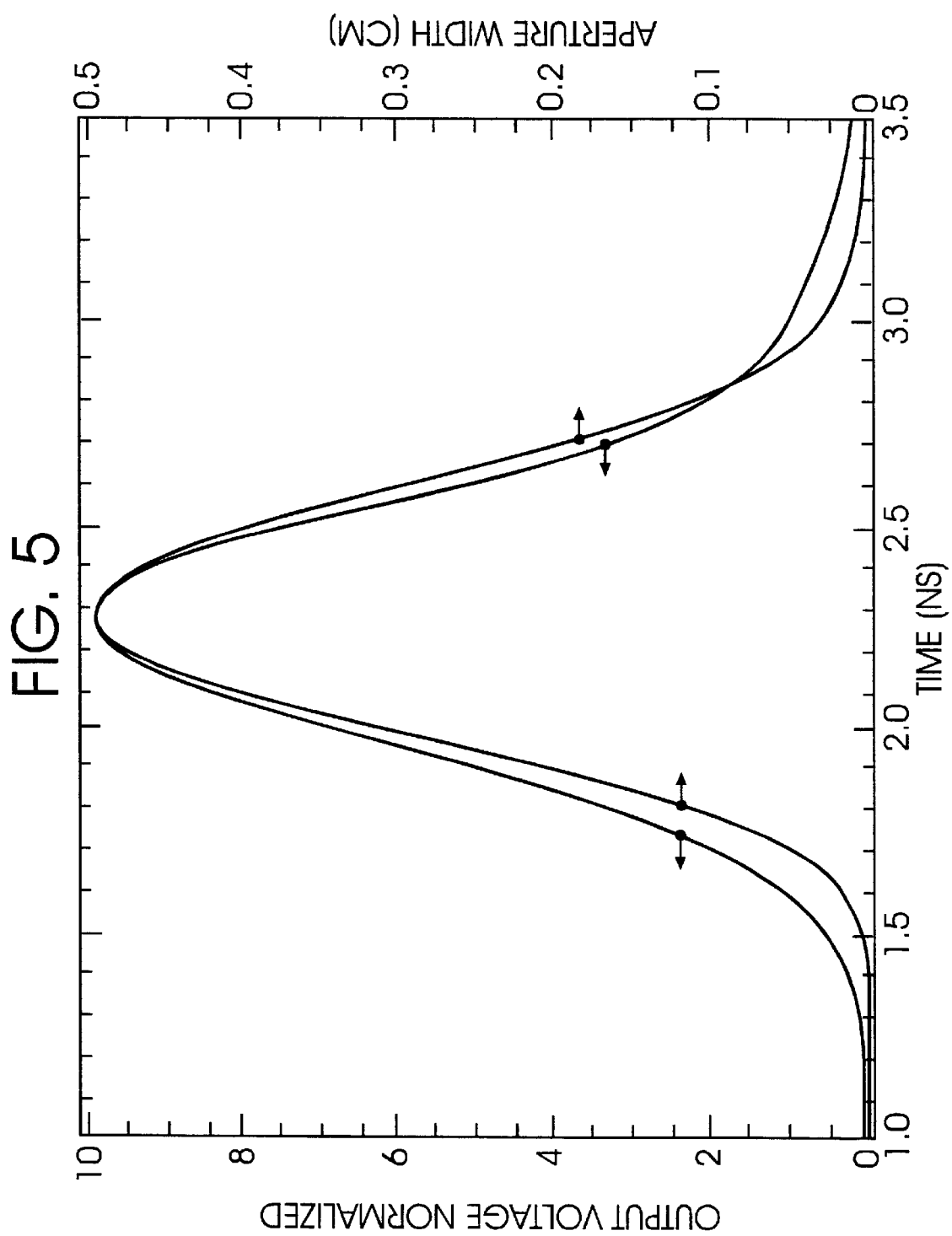
FIG. 5 is a plot showing the output voltage waveform from an ACSL with a Gaussian aperture with 5 mm maximum aperture width as a function of time. Over-plotted is the aperture width as a function of stripline length.
Figure 6:
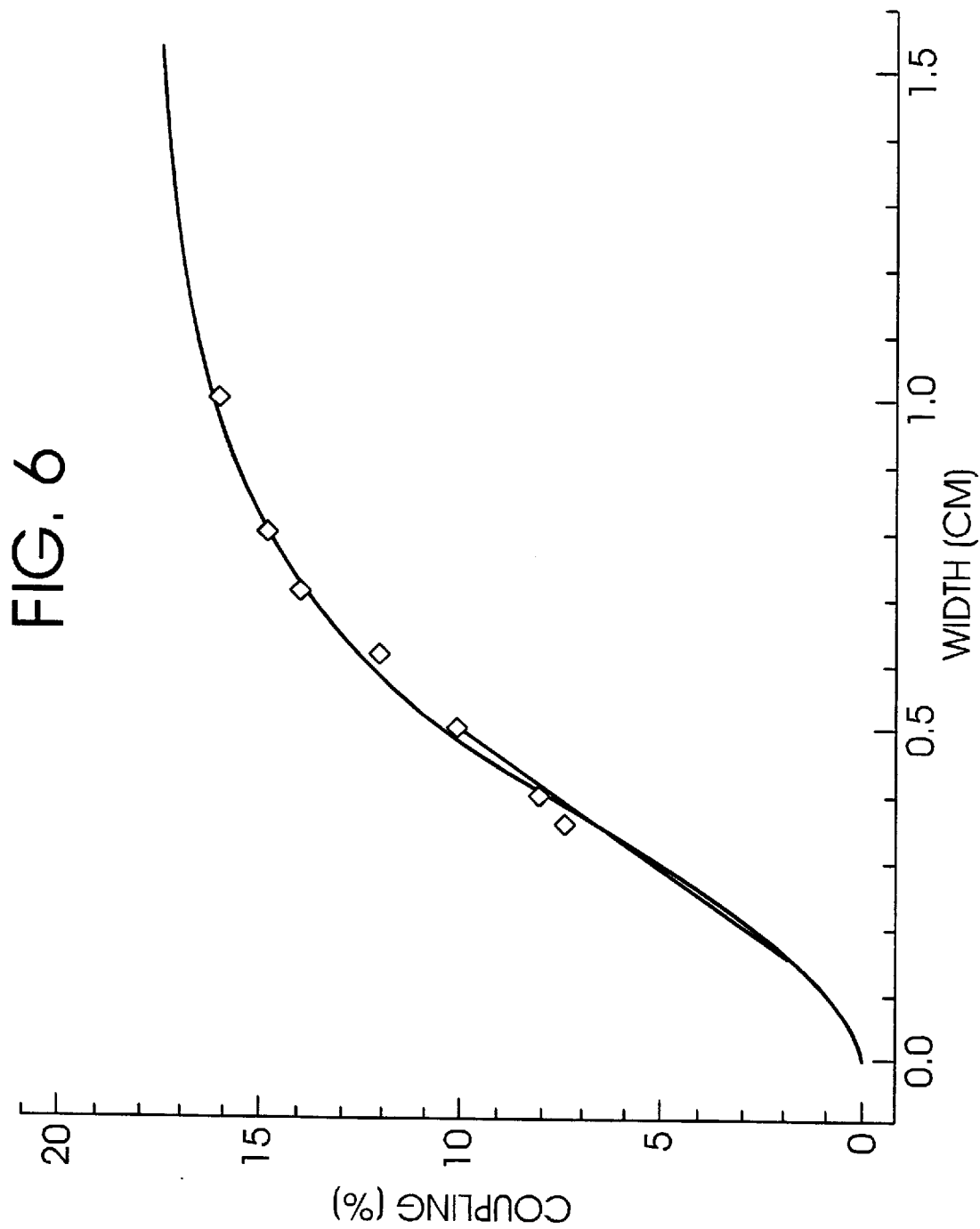
FIG. 6 is a plot showing the coupling coefficient of an aperture coupled stripline (ACSL) as a function of aperture width for the specific geometry discussed herein.

Two different apertures were fabricated and assembled into the above structure for measuring the dependence of the coupling coefficient on the aperture width s. The first aperture was designed so that the width s of the aperture varied along the length of the line with the functional form of a simple Gaussian with maximum width equal to 5 mm at the peak of the Gaussian. The coupling coefficient along the line was measured by injecting a 100 volt peak square pulse into port 1 of the ACSL. The output from port 3 was measured with a high-bandwidth (20 Ghz) HP5420B sampling oscilloscope. FIG. 5 shows the output voltage for this line as a function of time, or equivalently as a function of position along the line since the propagation velocity (equal to the speed of light/$\sqrt{\epsilon_r}$) is known. Over-plotted on this figure is the width of the aperture as a function of position along the ACSL. The square pulse generator was an existing in-house PC-switched square-pulse generator adjusted to provide a 100 volt peak square pulse. This voltage is specific for our pulse shaping application but is not limited by system components. The above measurements were confirmed with the HP5420B sampling oscilloscope which is equipped with a pulse generator for the time domain reflectometer (TDR) measurements. The square pulse was sent into port 1 of the ACSL and the output from port 3 was measured with a separate high-bandwidth (20 Ghz) channel of the oscilloscope. A second aperture (not shown) was measured. The second aperture was designed so that the widths of that aperture varied along the length of the line with the functional form of a triangle function with maximum width equal to 20 mm at the peak of the triangle. The output voltage of this line was also measured. From these measurements, the coupling coefficient as a function of aperture width s can be determined and is shown in FIG. 6. The information in FIG. 6 can be curve fitted and is the necessary design information for generating arbitrarily shaped electrical waveforms.

Figure 7:
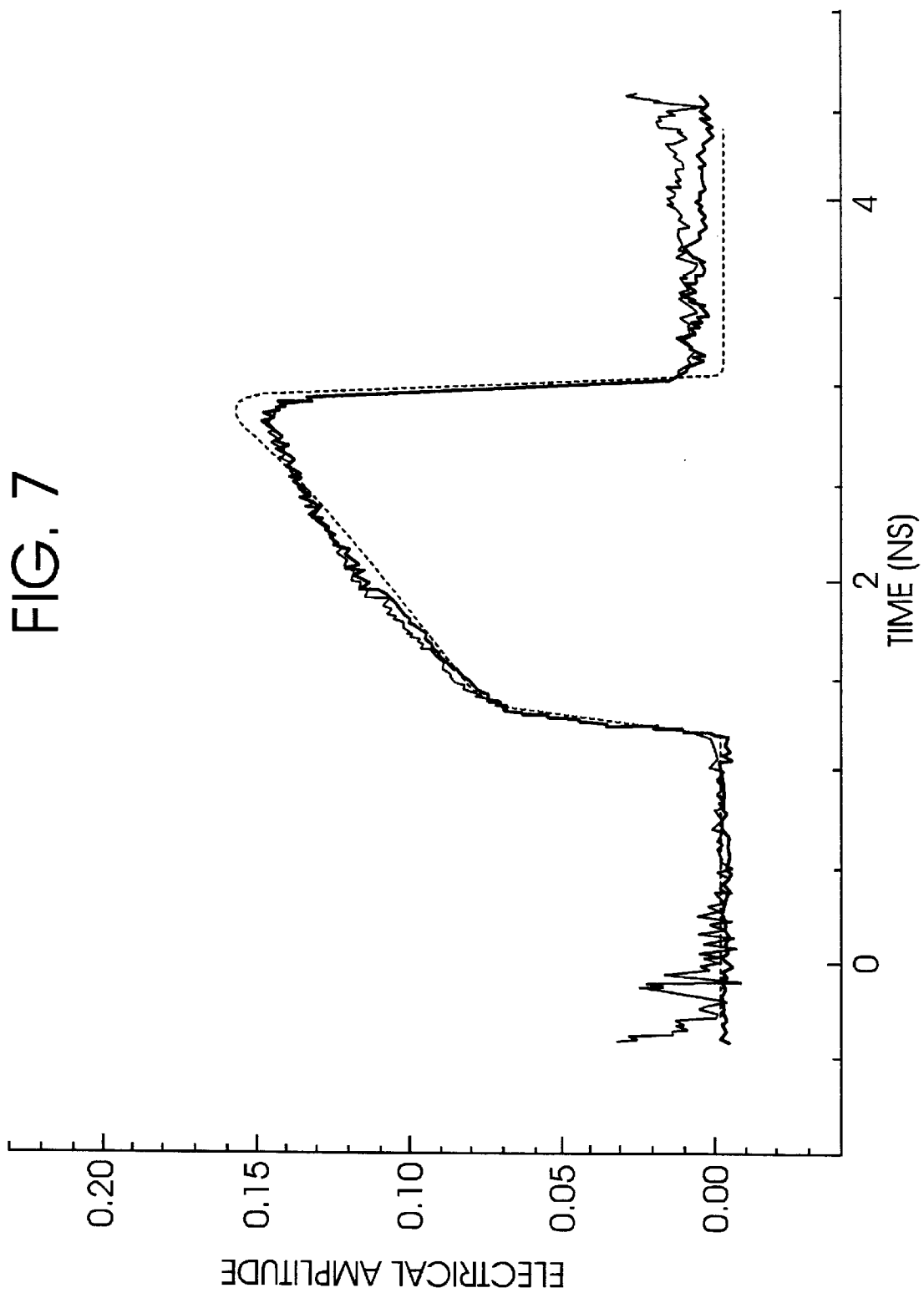
FIG. 7 is a plot of a shaped electrical waveform showing ~50 ps rise time. Over-plotted is the aperture width as a function of stripline length.

The bandwidth of the ACSL system was inferred from rise time measurements of shaped electrical waveformns. An aperture designed to produce a fast rising edge followed by a slow rising edge and fast fall (for use in compensating pulse distortion in the output of a regenerative amplifier) was fabricated and tested. FIG. 7 shows the results of this measurement. The rise time of the input square pulse applied to port 1 was on the order of 40 ps from the HP5420B TDR output channel and the fast-rising edge of the shaped electrical waveform was measured to be on the order of 50 ps (using the HP and the above high-bandwidth measurement procedure), well within the requirements of the OMEGA pulse shaping system.

A system provided by the invention can produce high-voltage temporally-shaped electrical pulses with high bandwidth suitable for (but not limited to) optical pulse-shaping applications. Variation and modification of the herein described system within the scope of the invention will undoubtedly present themselves to those skilled in this art. Accordingly, the foregoing description should be taken as illustrative and not in a limiting sense.

TABLE 1

| $E_r$ | h1 (in) | h2 (in) | w (mm) |
|-----|---------|---------|--------|
| 2.2 | 0.125 | 0.125 | 4.84 |
|     |       | 0.062 | 3.03 |
|     |       | 0.031 | 1.64 |
|     | 0.062 | 0.062 | 2.40 |
|     |       | 0.031 | 1.51 |
|     | 0.031 | 0.031 | 1.20 |
| 3.27 | .050 | .050 | 1.46 |
|     | 0.500 | 0.500 | 14.58 |
| 4.5 | 0.125 | 0.075 | 2.05 |
|     |       | .060 | 1.74 |
|     |       | .030 | 0.96 |
| 9.8 | 0.500 | 0.500 | 4.77 |

We claim:

1. A pulse shaping system comprising an aperture coupled transmission line assembly having an input line and an output line coupled via an aperture of shape corresponding to the desired temporal shape of output electrical pulses to be provided on said output line.

2. The system according to claim 1 further comprising means for applying input electrical pulses to said input line for shaping the temporal profile to provide said output electrical pulses.

3. The system according to claim 1 wherein said lines have input and output ports at opposite ends thereof, both said lines having the same characteristic impedance $Z_O$, and being terminated at said ports by means presenting said characteristic impedance.

4. The system according to claim 3 wherein said assembly has a plurality of layers of dielectric material, a first of said layers having a covering of conductive material with said aperture therein, second and third of said layers having electrodes respectively providing said input and output lines, said layers being disposed in sandwiched relationship with said lines in alignment, and said input and output lines overlapping each other and said aperture.

5. The system of claim 4 wherein said second and third layers space said lines from said covering with said aperture, said first layer being separable from said second and third layers to permit replacement of said first layer with another first layer with a corresponding covering, but with an aperture of different shape than said aperture of said replaced first layer.

6. The system of claim 4 wherein said covering is separated from said input line electrode by the dielectric material of said first layer, and said output line electrode is separated from said covering by the dielectric material of said third layer, and a forth of said plurality of layers overlaying said third layer, coverings of conductive material providing ground planes on said second and forth layers respectively spaced by the dielectric material thereof from said input and output line electrodes.

7. The system of claim 3 wherein said input and output lines are provided by electrodes having arcuate portions and straight portions, said arcuate portions providing transition regions between said straight portions and ports at the ends of said lines, said straight portions overlying each other and said aperture and bisecting said aperture, said arcuate portions having curvatures which provide said lines with said characteristic impedance.

8. The system according to claim 1 wherein means are provided for launching input pulses into a first port at one end of said input line which pulses travel along said line to a second port on end of said input line opposite the said one end, means terminating said input line at said opposite end thereof, said output line having a first port and a second port at opposite ends of said output line, said first and second ports of said output line being in reversed geometrical relationships to said first and second ports of said input line, means utilizing said output pulses connected to said second port of said output line, and means terminating said first port of said input line so that said input and output pulses propagate in reverse directions along their respective input and output lines.

9. The system of claim 1 wherein said aperture has a width in a direction perpendicular to the direction of propagation of pulses along said lines which is related to the temporal shape of said output pulses.

10. The system of claim 1 wherein an electro optic modulator is coupled in output pulse receiving relationship with said output line for shaping optical energy transmitted through said modulator into pulses of temporal shape corresponding to the temporal shape of said output pulses.

11. The system of claim 10 wherein means are provided for transmitting said optical energy through said modular in pulses synchronous with said output pulses for temporally shaping of said optical pulses corresponding to the temporal shapes of said output pulses.

* * * * *